Figure 1A:
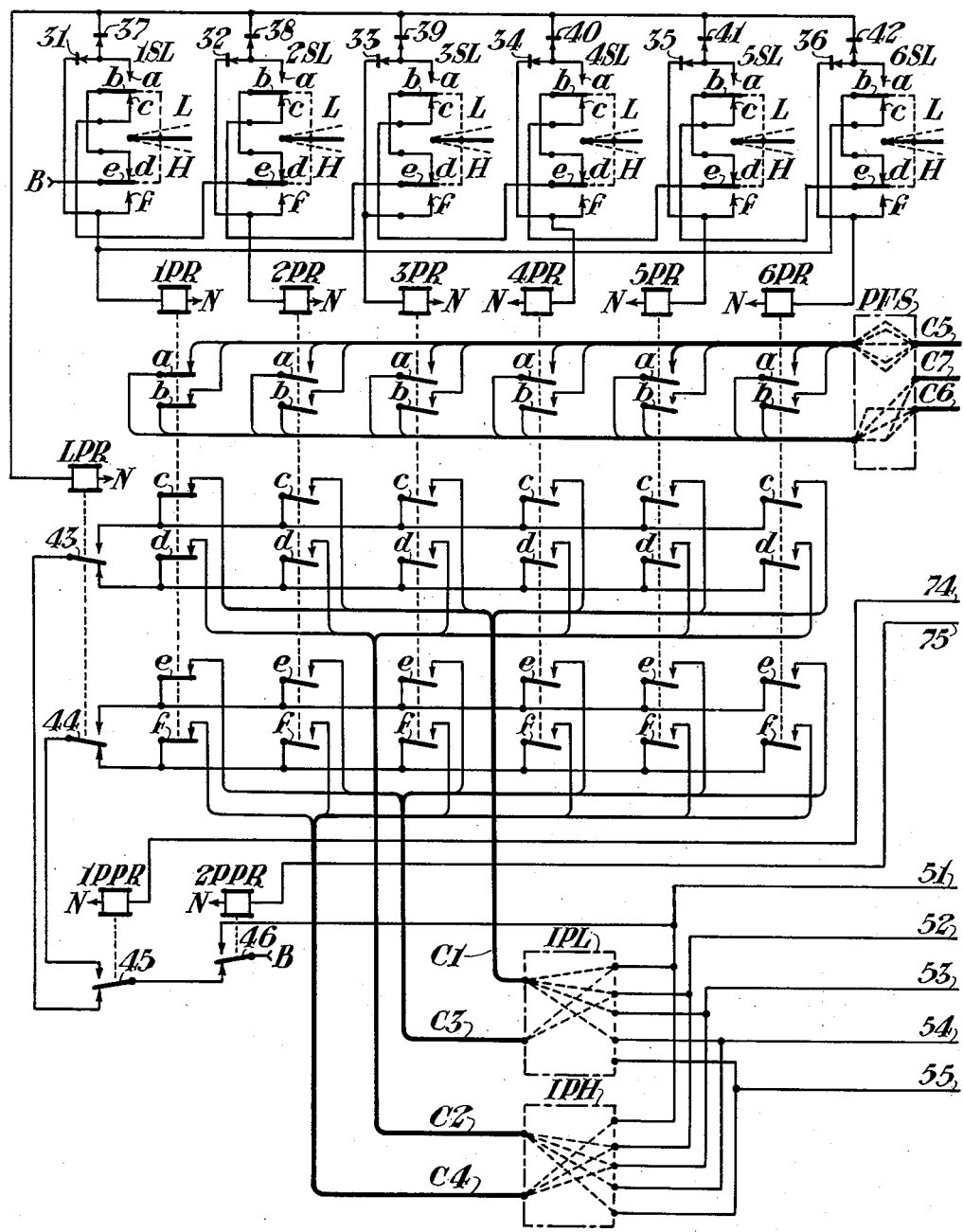

INVENTOR.
William A. Robison Jr.
BY W. L. Stout
HIS ATTORNEY

United States Patent Office 2,964,618
Patented Dec. 13, 1960

2,964,618

CAR RETARDER SPEED PRESSURE SELECTIVE CONTROL APPARATUS

William A. Robison, Jr., Pittsburgh, Pa., assignor to Westinghouse Air Brake Company, Wilmerding, Pa., a corporation of Pennsylvania Filed Mar. 26, 1954, Ser. No. 418,801

2 Claims. (Cl. 246—182)

My invention relates to car retarder speed pressure selective control apparatus and more particularly to speed and pressure selecting circuits for car retarders of the electropneumatic type.

In classification yards using humps, car retarders are provided for governing the speed at which cuts of cars or car units approach the yard tracks into which they are being classified. Obviously, there is a correct speed at which a car unit should drift into the yard track and couple to the cars already standing on that track without too great an impact. That is, there is a correct speed at which a car unit should leave a car retarder. Thus, the degree of braking pressure or force exerted by a car retarder must be varied for different car units in order to have each unit leave the retarder at the correct speed. Formerly, the car retarder was electrically controlled by an operator located in a tower where he could observe the car unit and govern the braking force of the car retarder according to the speed at which the car unit in his judgment was moving and also according to his judgment of the probable acceleration of the car unit when released.

In such classification yards, the cars move from the hump under the influence of gravity and the speed of the individual car units varies depending, among other things, upon the speed at which it is pushed over the hump, the weight of each car and its contents, the temperature, and the free running condition of the car. These circumstances make it difficult for an operator to properly judge the degree and extent of braking force that should be exerted by the car retarder in order to have the individual car units leave the retarder at the correct speed. Therefore, a system has been developed to control the braking pressure or force of car retarders automatically according to the speed at which the car unit moves through a retarder, thereby eliminating the errors that may arise due to an operator wrongly judging the car speed and its running condition.

In bringing a car unit to the correct speed when electropneumatic car retarders are used, it is desirable to provide a given initial pressure on the retarder as the car enters the retarder and then reduce the pressure to a partial pressure as the car speed is lowered to near the correct or desired leaving speed. The retarder pressure is then finally released when the car is moving at approximately the correct leaving speed. It has been found that it is also desirable to vary the initial pressure according to the desired leaving speed and also to vary the partial pressure to which the initial pressure is reduced according to the desired leaving speed.

In addition to varying the initial and partial pressures according to the desired leaving speed, it has also been found desirable to vary the pressure selections according to the weight of the car and its contents. In other words, for a heavy weight car for which a certain leaving speed has been selected, one set of initial and partial pressures and pressure release speeds is the most appropriate for the proper movement of the car or car unit.

For a lightly loaded car for which the same leaving speed is desired, a second set of initial and partial pressures and pressure release speeds is the most appropriate for properly controlling the movement of that car. Therefore, some method of establishing the appropriate weight level of a car unit, in addition to selecting a leaving speed, is necessary in such an automatic speed control system. One method of obtaining this result is to provide the operator with means to select between different pressure ranges for the light and heavy cars for each leaving speed provided on his control panel. The operator may then use the information provided on the printed switching list to judge whether or not a car should be classified as light or heavy weight and when selecting the proper leaving speed for that car, he may also differentiate between the light and heavy pressure selections.

Accordingly, an object of my invention is the provision of improved car retarder selective control apparatus.

Another object of my invention is the provision of car retarder control apparatus incorporating novel means for selecting different initial and partial pressures for a retarder in accordance with the weight of the car unit to be moved through that retarder.

Again, a feature of my invention is the provision of novel and improved selective circuit means for electropneumatic car retarders to enable the setting up of different pressure and speed releasing conditions of the car retarder according to car weights.

A more specific feature of my invention is the provision of improved means for selecting any one of a group of initial pressures for the retarder when the car enters the retarder and any one of a group of partial pressures to which the initial pressure is reduced as the car approaches a desired or requested leaving speed for each of a relatively large number of different possible leaving speeds based on the light or heavy weight classification of the car unit.

Other objects, features and advantages of my invention will appear as the specification progresses.

Electropneumatic car retarder mechanisms of the type here contemplated include braking bars mounted adjacent the rails of a stretch of railway track and movable to a braking position where they engage the side of the wheels of a car moving along the stretch and to a nonbraking position where the bars are free from the car wheels. Generally these braking bars are biased to the nonbraking or open position and are movable to the braking or closed position by a group of independent pressure actuated motors. The braking force exerted depends upon the pressure of the fluid, which is usually compressed air, applied to the motors. The pressure applied to the operating motors is controlled by magnet valves, and in a widely used form of retarder mechanism the control apparatus is capable of setting up any one of four different pressure conditions. It is to be understood that my invention is not limited in its use to this specific arrangement of a car retarder control and it can be used with other control arrangements.

Furthermore, when automatic speed control is provided for a car retarder, the stretch of track associated with the retarder is provided with one or more wayside or track circuits which are responsive to a car passing therethrough. These circuits govern a speed measuring means in such a manner that the car speed as it moves through the retarder is repeatedly determined, the speed measuring function being continued until the last pair of car wheels leave the retarder.

The foregoing objects, features, and advantages of the speed pressure control apparatus of my invention are obtained for a car retarder of the type here contemplated by the provision of a series of leaving speed selectors and speed pressure selective circuit networks. A preferred form of the selector is that of a series of levers and a series of repeater relays, one repeater relay for each selector lever. Each selector is assigned an individual leaving speed, that is, a speed at which a car should leave the retarder. Thus, there are as many different leaving speeds possible as there are selector levers. For example, there may be a series of 6 levers with each assigned an individual leaving speed selected in the speed range of 3 to 20 miles per hour. The arrangement is such that when a lever is operated to select a leaving speed, the corresponding repeater relay is energized and retained energized until a new leaving speed is selected by the operation of a different selector lever. The levers and the repeater relays are so interconnected that if more than one lever is pressed at a time accidentally, the lowest leaving speed of the several levers operated is the one that is made effective.

The levers used are three position type levers which normally occupy the center or at-rest position. This is the position which they occupy when no operation of the retarders is contemplated or desired. However, even in this position, the circuits are so arranged that the lowest speed assigned to the series of selector levers is chosen, that is, the repeater relay of the low speed lever is energized. These levers have a first position to which they are operated when the car or car unit is of the heavy weight classification. A second position is used when the car unit is classified as light weight. The light weight or second position of each of the selector levers is also repeated by a light pressure relay which is energized when any one of the selector levers is operated to its second position. This light pressure relay selects between two sets of contacts of the usual lever repeater relays. These two sets of contacts in turn select between two pressure networks for varying the initial and partial pressures which are applied by the car retarder to the car unit.

The speed pressure selective circuit networks are made up of two types of networks. The first type includes an initial pressure and a partial pressure control panel or terminal board and contacts of the repeater relays of the selector levers. The control panel is provided with repeater relay jacks and car retarder pressure control jacks. These jacks are grouped and interconnected with repeater relay contacts in such a manner as to enable circuits to be set up which may select any one of several different initial pressures for the retarder when a car enters the retarder. Also, it permits circuits to be selected for any one of several different partial pressures to which the initial pressure is reduced for each of the series of different leaving speeds. This panel arrangement and the associated circuits enable the selections desired to be set up by plug connectors or jumpers and the selections can be changed from time to time as required for the operation of the retarder without any change in the circuits except for the changing of the plug connectors. Two sets of this first type of pressure network are provided, one to provide for selection of the pressures for the heavy weight cars and the other network to provide for selection of pressures for the light weight cars. Selection between the two networks is made by the aforementioned light pressure repeater relay which selects between various sets of contacts of the lever repeater relays.

The second type of circuit network includes another control panel or terminal board having repeater relay jacks and speed selection jacks grouped thereon together with repeater relay contacts and contacts of car speed measuring means. This network enables circuits to be set up by plug connectors or jumpers for any one of a series of partial pressure release speeds and full release speeds for each of the leaving speeds provided by the selector levers.

I shall describe one form of apparatus embodying my invention and shall then point out the novel features thereof in claims.

Figure 1B:
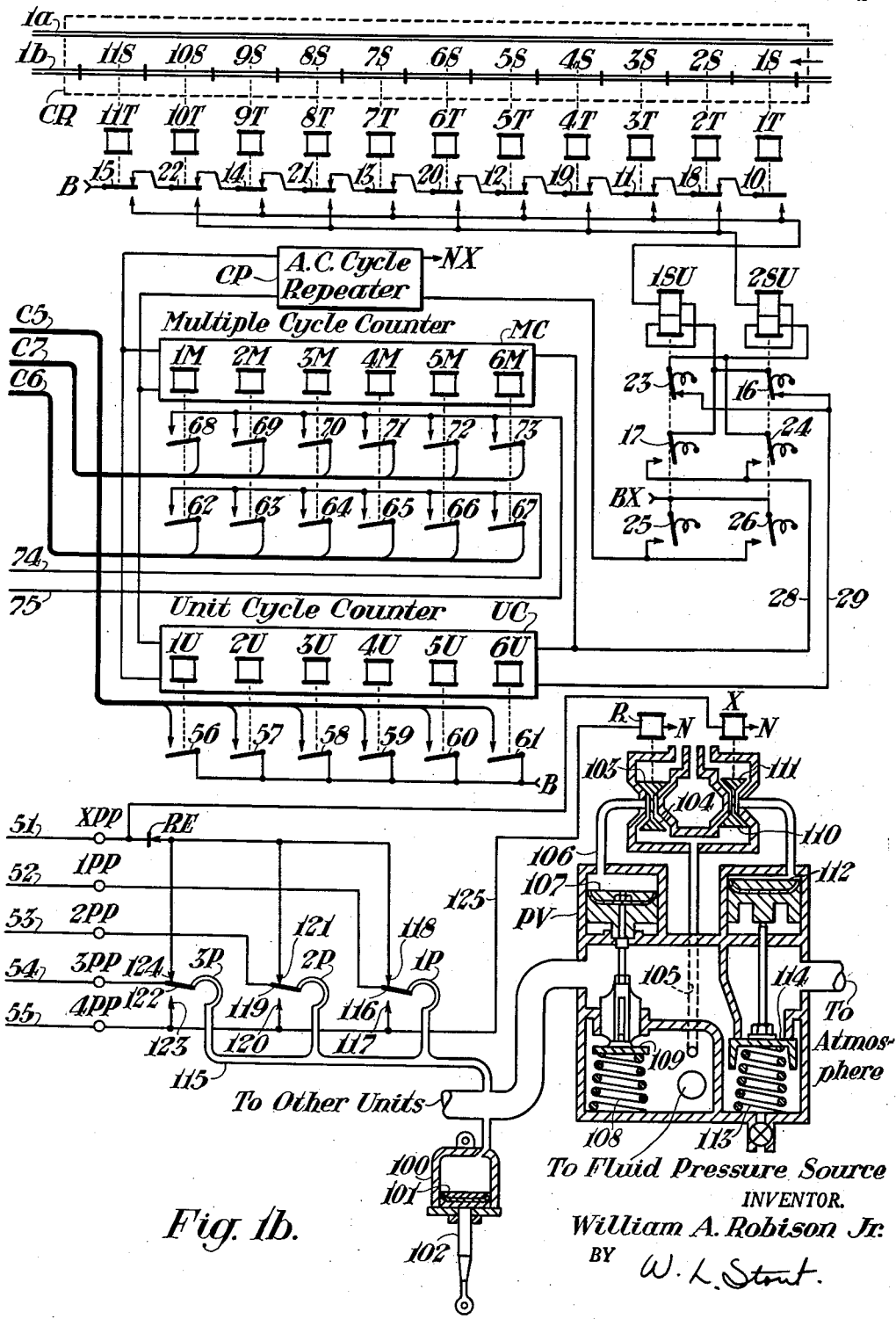

In the accompanying drawings, Figs. 1a and 1b when placed side by side, with Fig. 1a at the left, are a diagrammatic view showing one form of apparatus embodying my invention when used with an electropneumatic car retarder.

It is to be understood that a source of direct current energy, such as a battery, is provided for the apparatus, although not shown in the drawings. The positive and negative terminals of this source are designated in the drawings by the reference characters B and N, respectively.

Referring to the drawings, the reference characters 1a and 1b on Fig. 1b designate the track rails of a stretch of railway track provided with a car retarder shown conventionally by a dotted rectangle CR. The retarder CR may be of any one of several different arrangements and may, for example, be similar to the widely used electropneumatic mechanism disclosed in Letters Patent of the United States No. 1,927,201, granted September 19, 1933, to Herbert L. Bone, for Railway Braking Apparatus, and reference is made to that patent for a full description of the retarder here contemplated. For the sake of simplicity, in the present application only a portion of the retarder mechanism sufficient for a full understanding of the invention is shown, and the mechanism will be described only briefly.

In Fig. 1b, the cylinder 100 comprises the operative means for one of the independent operating units which operate the braking bars (not shown) for applying a braking or retarding force to the wheels of cars passing through the retarder by frictionally engaging the opposite sides of the wheels. Each of the other operating units has a similar cylinder to which fluid under pressure is supplied or exhausted in multiple with cylinder 100. The cylinder 100 contains a piston 101 attached to a piston rod 102, the outer end of which is adapted to be connected to the braking bars through a linkage, not shown. When fluid under pressure is admitted to the cylinder 100, above the piston 101, the piston is forced downward and the braking bars are moved to the braking position. When the fluid, herein considered to be compressed air, is exhausted from the cylinder to atmosphere, the braking bars and linkage are spring and/or gravity biased to the released or nonbraking position and the piston 101 is moved to the top of the cylinder. The supply of air to the cylinder 100 is controlled by a pneumatic control valve PV, which in turn is controlled by two magnet valves X and R.

Normally, that is, when no car is moving through the retarder, the braking bars are held at the braking position by full pressure in the cylinder 100, the full pressure being of the order of 100 pounds per square inch. Under this normal condition, the magnet valve R is energized and the magnet valve X is deenergized. With magnet valve R energized, its valve 103 is closed and its valve 104 is open. At this time, compressed air is admitted through ports 105 and 106 from the air pressure source to the chamber above the piston 107 of the pneumatic valve PV. This piston is then forced downward against the force of a biasing spring 108, thereby opening a valve 109 and admitting compressed air from the source of supply to the cylinder 100. With the magnet X deenergized, its valve 110 is closed and its valve 111 is open. With valve 111 open, the chamber above the piston 112 of the valve PV is exhausted to atmosphere and the piston 112 is forced upward by a bias spring 113, closing a valve 114 and thereby disconnecting the exhaust port through which fluid for the cylinder 100 is exhausted to atmosphere from the cylinder.

When the magnet valve X is energized and the magnet valve R is deenergized, the pressurized air above the cylinder 107 of the control valve PV is exhausted to atmosphere through the now open valve 103 and in turn the valve 109 is closed to cut off the supply of compressed air from the source to the cylinder 100. Also, compressed air is now admitted above the piston 112 and it is forced downwardly to open valve 114 which opens the port for exhausting the air in the cylinder 100 to atmosphere.

The two magnet valves R and X are controlled in part by a group of pressure responsive devices 1P, 2P, and 3P, each of which comprises a Bourdon tube connected in multiple by a pipe 115 to the pipe leading to the cylinder 100. Each Bourdon tube actuates a contact member between a first and a second position. For example, the tube 1P actuates a contact member 116 to a first position, that is, downward from the position shown in Fig. 1b, where it engages a stationary contact 117, and to a second position, that is, the position shown in the drawing, where it engages a stationary contact 118. Similarly, the tube 2P actuates a contact member 119 between a first position engaging contact 120 and a second position engaging contact 121; and the tube 3P actuates a contact member 122 between a first position engaging contact 123 and a second position engaging contact 124.

These pressure regulating tubes are constructed and adjusted so as to successively operate as the air pressure applied to the cylinder 100 increases. For example, for all pressures below 25 pounds per square inch applied to cylinder 100, the first position contact of each tube 1P, 2P, and 3P is closed. If the pressure exceeds 25 pounds per square inch, the contact 116—117 of tube 1P is opened, and if the pressure exceeds 35 pounds per square inch the second position contact 117—118 of the tube 1P is closed. Again, the first position contact 119—120 of the tube 2P is opened when the pressure exceeds 50 pounds per square inch and its second position contact 119—121 is closed when the pressure exceeds 60 pounds per square inch. Also the first position contact 122—123 of the tube 3P is opened when the pressure exceeds 75 pounds per square inch and its second position contact 122—124 is closed when the pressure exceeds 85 pounds per square inch.

The car retarder CR is provided with a group of control circuit terminals XPP, 1PP, 2PP, 3PP, and 4PP to which terminals positive energy is selectively applied for control of the magnet valves R and X. It is to be seen that when positive energy is normally applied to the terminal 4PP in a manner to appear later, the magnet valve R is energized over wire 125, and the above described normal full pressure condition of the retarder is established. If positive energy is removed from terminal 4PP and applied to terminal XPP, the magnet X is energized, the magnet R is deenergized, and any fluid pressure in the cylinder 100 is exhausted so that the car retarder is operated to its open or released position, each of the pressure tubes 1P, 2P, and 3P assuming its first position under this condition. If positive energy is now removed from terminal XPP and applied to terminal 1PP, the magnet X is deenergized, the magnet R is energized through the first position contact 116—117 of tube 1P, and the full pressure of the source is applied to cylinder 100. When the pressure builds up to about 25 pounds per square inch, the contact 116—117 is opened and the magnet R is deenergized, and the pressure of approximately 25 pounds per square inch is retained in the cylinder 100. In case the pressure in cylinder 100 continues to increase and exceeds 35 pounds per square inch, the contact 116—118 of tube 1P is closed and the magnet X is energized through a path including a half-wave rectifier element RE. With magnet X thus energized, the air in the cylinder 100 is exhausted until the pressure is less than 35 pounds per square inch at which time the contact 116—118 opens to interrupt the energy being supplied to magnet X. If the pressure in cylinder 100 falls below 25 pounds so that the contact 116—117 is reclosed, the magnet R is energized to reapply air to the cylinder 100. It follows that when energy is applied to terminal 1PP of car retarder CR is maintained between 25 and 35 pounds per square inch.

When positive energy is applied to terminal 2PP, the magnet R is energized through the first position contact 119—120 of the tube 2P and full pressure is applied to the cylinder 100. At this time, the pressure applied to the cylinder 100 is maintained between 50 and 60 pounds per square inch by tube 2P, the tube functioning in substantially the same manner as the tube 1P functioned to maintain the pressure of cylinder 100 between 25 and 35 pounds.

Again, if positive energy is applied to terminal 3PP, the magnet R is energized through the first position contact 122—123 at tube 3P and pressure is applied to the cylinder 100. The pressure is then maintained between 75 and 85 pounds per square inch by the action of the tube 3P. To sum up, therefore, when positive energy is applied to terminal 4PP the full pressure of the compressed air source is applied to the cylinder 100, and when positive energy is applied to terminal XPP, the air is exhausted and the retarder is opened. Further, when positive energy is applied to terminal 1PP a braking pressure between 25 and 35 pounds is maintained on the retarder, while positive energy applied to terminal 2PP results in a pressure on the car retarder of between 50 and 60 pounds per square inch. Finally, when positive energy is applied to terminal 3PP, a pressure between 75 and 85 pounds is applied to the retarder.

In manual control of the retarder, a manual selector lever operable to different circuit controlling positions is provided whereby the operator can selectively apply energy to any one of the control terminals of the car retarder. However, when the application of pressure to the retarder is to be controlled automatically, the manual control means is disconnected, and apparatus embodying my invention is used for controlling the energy applied to the car retarder terminals. Since manual control is not here contemplated and automatic control is to be used, the manual control circuits are not shown for the sake of simplicity. The manner of selectively applying positive energy to this group of control circuit terminals of a car retarder automatically will now be described.

Since automatic control of a retarder involves determining the speed of the car moving through the retarder, the speed of a car moving through this associated stretch of track is repeatedly determined by any suitable arrangement, the specific structure of such speed measuring means forming no part of my present invention. As here shown, the speed determining means includes track circuits and a time measuring device. The track circuit arrangement here disclosed is substantially that disclosed and claimed in a copending application for Letters Patent of the United States, Serial No. 283,931, filed April 23, 1952, by David P. Fitzsimmons, for Railway Car Speed Determining and Control Apparatus, now Patent No. 2,751,492, issued June 19, 1956. Reference is made to the foregoing Fitzsimmons patent for a full description of the track circuit arrangement here contemplated and it is here described only to the extent needed to understand its relationship to my invention.

The stretch of track associated with the retarder CR is formed into a series of track sections 1S to 11S, inclusive, by insulated rail joints placed in the rail 1b, the rail 1a being electrically continuous and common to all of the track sections. The sections are relatively short and are of the same length, a length of the order of 3 feet 1½ inches being suitable for the form of car retarder here contemplated. This length is also such that only one pair of car wheels can occupy a section at a time. Obviously, other arrangements of these sections can be used. Each section is provided with a normally energized track circuit having a track relay identified by the reference character T plus a numeral corresponding to the section. As explained in the aforementioned Fitzsimmons patent, each track relay is controlled by a holding or stick circuit, a shunting circuit, and a pickup or reset circuit. The holding circuit for each track relay includes a front contact of the relay and a front contact of all the following track relays except the relay for the last or leaving section 11S. The shunting circuit for each track relay includes the track rails of the corresponding section so that the relay is shunted and releases in response to a pair of car wheels occupying the section. The reset circuit is such that the relays are energized in cascade and a particular relay can pick up only when all the relays to the rear have picked up. This control of the track relays assures that the track relays successively release in response to the leading pair of car wheels passing through the sections. The control is then passed to the next pair of wheels to the rear when the leading pair of wheels leave the last section. This control is successively passed to the other pairs of car wheels until the last pair of wheels of the car leave the last section.

These track circuits are used to control two normally deenergized relays 1SU and 2SU, these relays being of the biased type and being alternately energized as the car moves through the series of sections. To this end, the relay 1SU is energized by a circuit which includes positive terminal B of the current source, back contacts 10, 11, 12, 13, 14, and 15 in multiple of the odd numbered track relays 1T, 3T, 5T, 7T, 9T, and 11T, respectively, and a front contact of each of the remaining relays in advance of the shunted relay. The circuit further extends through the windings of the relay to the negative terminal N of the source through reverse contact 16 of relay 2SU, wire 29, and the starting circuit of a time measuring means to be referred to shortly. This circuit for relay 1SU is provided with an alternative path which includes normal contact 17 of the relay, wire 28, and the holding or operating circuit of the time measuring means. Similarly, the control relay 2SU is provided with an energizing circuit which includes the positive terminal B of the source, back contacts 18, 19, 20, 21, and 22, in multiple, of the even numbered track relays 2T, 4T, 6T, 8T, and 10T, respectively, front contacts of the track relays in advance of the shunted relay, the windings of relay 2SU, reverse contact 23 of relay 1SU, wire 29, and the starting circuit of the time measuring means. The relay 2SU is also provided with an alternate circuit path which includes its own normal contact 24, wire 28, and the operating or holding circuit of the time measuring means. It follows that when a car moves through the sections 1S to 11S, the relays 1SU and 2SU are alternately energized and deenergized, the relay 1SU being energized and operated to its normal position as the leading pair of wheels of the car move through each of the odd numbered track sections and the relay 2SU being energized and operated to its normal position as the leading pair of car wheels move through each of the even numbered track sections.

Control relays 1SU are used to control a time measuring means to determine the car speed in each of the track sections by determining the time consumed by a pair of car wheels in moving through each individual section. This time measuring means may take any one of several different forms of the type which is biased to an initial position and is operated to an extreme position at a given rate when supplied with current, it being immediately reset to its initial position from whatever position to which it has advanced when the supply of current is interrupted. Hence, with the operation of the time measuring means initiated when the leading pair of wheels enter the sections 1S to 11S successively, the speed of the car in each of the sections is determined by the extent to which the time measuring means is operated while the car occupies that section.

The time measuring means herein shown is that described and claimed in Letters Patent of the United States No. 2,320,802, granted June 1, 1943, to Clarance S. Snavely, for Railway Braking Apparatus, and reference is made to that patent for a complete description of the time measuring means here contemplated.

It is sufficient for the present application to describe the time measuring means only briefly. This time measuring means is an alternating current cycle counting device comprising a source of alternating current, an alternating current cycle repeater CP, a unit cycle counter UC and a multiple cycle counter MC. The alternating current source, the terminals of which are indicated at BX and NX, may be a 60 cycle source but other frequencies can be used. The cycle repeater CP includes quick acting relays and rectifiers, the relays being operated to alternately close contacts in step with the cycles of the alternating current. That is, a pair of contacts are alternately closed and opened, each contact being closed $\frac{1}{60}$ of a second and then opened for a like period. The unit cycle counter UC includes a chain of 6 relays 1U to 6U, inclusive. This chain is connected to the cycle repeater CP and the relays operated one after the other by the current impulses created by the operation of the contacts of the cycle repeater. Thus, the action of the chain is advanced by one relay each cycle of the operating current. The relays of the chain are interconnected so that when the count of six is exceeded the chain doubles back and continues to count over and over again. The multiple cycle counter MC includes a chain of six counting relays 1M to 6M, inclusive. This chain is connected to the unit cycle chain UC in such a manner as to progressively pick up the relays one each time the unit chain completes a round trip operation. Thus, the six relays of the multiple counter MC are all picked up in response to six round trip operations of the unit cycle counter chain UC. That is, the relays of the counter MC are all picked up in response to 36 cycles of the alternating current. It follows that the extreme position of the time measuring means is reached in seven round trip operations of the unit cycle counter UC and a count of 42 cycles of alternating current is made, the total time being 0.7 second or 700 milliseconds when the frequency of the source used is 60 cycles per second.

It is to be observed that the particular relays of the two chains UC and MC which are picked up at any instant are a measure of the time consumed after the initiating of the operation. Alternating current is supplied from the source to the time measuring means through a simple circuit that includes in multiple normal contacts 25 and 26 of the two control relays 1SU and 2SU, respectively. Consequently, with the relays 1SU and 2SU energized alternately as a pair of car wheels move through the track sections 1S to 11S, a new operation of the time measuring means is initiated for each track section and the speed of the car in each section is determined by the extent to which the relays of the two chains UC and MC are operated. For example, if the relays 6M and 6U are picked up while a pair of car wheels move through the 3 feet 1½ inches of a track section, the average speed of the car in that section is approximately 3.1 miles per hour. Again, if only the relay 1M is picked up while a pair of car wheels move through a track section the average speed is approximately 21.3 miles per hour. Hence, this time measuring means is capable of measuring a range of speeds from 3 to 20 miles per hour for each section associated with the car retarder.

As previously explained, there are different correct speeds for car units to leave the retarder and it is desirable to vary the initial pressure applied to the retarder as the car enters according to the selected leaving speed. It is also desirable to have the partial pressure to which the initial pressure is reduced as the car slows down to the requested leaving speed vary with the selected leaving speed. In addition, it has been found desirable to vary the selected initial and partial pressures in accordance with the weight of the car, the differentiation in the present invention being between a heavy and a light weight classification. Furthermore, it is desirable to preselect the partial pressure release speed and the full release speed for each possible leaving speed. According to my invention, pressure and speed selections are accomplished by a group of leaving speed selectors and a speed pressure selective network which includes contacts operated by the speed measuring device.

Referring to Fig. 1a, the leaving speed selectors include a series of six selector levers, 1SL to 6SL, inclusive, and a series of six lever repeater relays 1PR to 6PR, inclusive, there being a repeater relay for each selector lever. These selector levers normally stand at-rest in their center position, that is, the position as shown in Fig. 1a. In this position the contacts b—c and d—e of each selector lever stand closed. These levers are operable to a first and a second position, that is, to a down and an up position, respectively, as shown in the drawing. The first position is that used for the heavy weight cars and is designated H in Fig. 1a, while the second position is that used when selecting leaving speeds for light weight cars and is therefore designated L in the drawing. These levers are so arranged that the contact b—c of each lever is closed when the lever occupies its center and H positions but is open when the lever occupies its L position, whereas the contact d—e of each lever is closed when the lever occupies its center and L positions but is open when the lever occupies its H position. The contact a—b of each lever is closed only when the lever occupies its L position, while the contact e—f of each lever is closed only when the lever occupies its H position. These selector levers are assigned individual leaving speeds. For example, the leaving speeds of 4, 5, 6, 7, 8, and 9 miles per hour may be assigned to the selector levers 1SL, 2SL, 3SL, 4SL, 5SL, and 6SL, respectively. The invention is not limited to this series of six leaving speeds, but these speeds are used for illustration only and other leaving speeds can be assigned. Also, it is to be understood that a larger or a smaller number of selector levers can be used.

Each of the repeater relays is energized over circuits that include an operated position contact of the corresponding selector lever and the closed contacts of all these levers ahead of that particular one. For example, the circuit for the repeater relay 6PR when lever 6SL is in its first or H position may be traced from terminal B of the source through contacts d—e and b—c of lever 1SL and, in order, through the similar contacts of the other levers 2SL to 5SL, contact e—f of lever 6SL, and the winding of relay 6PR to terminal N of the source. If the lever 6SL is in the second or L position, the energizing circuit would be the same as just described up to the contacts of the lever 6SL, and then through contacts d—e and a—b of this lever, rectifier 36 in its forward direction, and the winding of the relay 6PR to terminal N. Each of the remaining repeater relays is provided with energizing circuits similar to those just described for the relay 6PR.

It is to be noted that the relay 1PR is normally energized over a circuit which may be traced from terminal B over the contacts d—e and b—c of each of the levers, in series, and through the winding of the relay 1PR to terminal N. The relay 1PR may also be energized over two other circuits which are selectively closed according as the lever 1SL is operated to its H or its L position. The first of these circuits includes contact e—f, closed when the lever is in its H position, while the second circuit, closed when the lever is in its L position, includes contacts d—e and a—b and rectifier 31. Thus, the lowest leaving speed of 4 miles per hour is normally requested, that is, established when all the levers are in their center or nonoperated position as well as being requested when the lever 1SL is operated to either of its positions. This interconnection of the repeater relay circuits assures that if two or more levers are accidentally operated at the same time, the relay corresponding to the lowest leaving speed of the operated levers is the only one energized. The circuits are thus of the safety type and a mistake in the operation will result in the lowest leaving speed being designated. Contacts of this series of repeater relays are used in the circuit networks as will appear hereinafter.

The light pressure relay LPR is energized any time a lever is operated to its second position. This relay is thus a repeater of the light weight position of each lever. For example, if the lever 3SL is operated to its second or L position, a circuit is established for energizing relay LPR which may be traced from terminal B of the source through the closed contacts d—e and b—c of levers 1SL and 2SL, contacts d—e and a—b of lever 3SL, rectifier 39 in its forward direction, and the winding of relay LPR to terminal N of the source. Current would also flow through the first portion of the same circuit and rectifier 33 in its forward direction to energize relay 3PR. The relay LPR cannot be energized when any lever occupies its first or heavy weight position because of the blocking action of the rectifiers 31 to 36, inclusive. In a similar manner, the rectifiers 37 to 42, inclusive, prevent the energizing of more than one lever repeater relay at a time. These rectifiers, by their blocking action when current attempts to flow in the reverse direction, assure the proper operation of the selector levers, the repeater relays, and the light pressure relay.

The speed pressure selective networks or means include a first type of network, the initial and partial pressure selective network, and a second type, the partial pressure release speed and full release speed selective network. Two networks of the first type are indicated on Fig. 1a by the dot-dash rectangles designated IPL and IPH. One network of the second type is also shown on Fig. 1a by the dot-dash rectangle designated PFS. These networks are shown in this conventional manner as they are not part of my invention. Reference is made to the copending application for Letters Patent of the United States, Serial No. 283,932 by Edward J. Agnew, filed April 23, 1952, for Car Retarder Speed Pressure Selective Control Apparatus, now Patent No. 2,727,138, issued December 13, 1955, for a complete showing and description of these networks. It is sufficient here to describe these networks as including or consisting of insulated panels with all incoming wires being terminated in jacks mounted in these insulated panels. Selection, then, of the initial and partial pressures or the pressure release speeds is made as desired using jumpers having plug connectors between the various jack terminals.

In a manner similar to that described in the Agnew patent, the front contacts c of the lever repeater relays of the present application are connected through the cable C1 to various jacks on the panel IPL to provide for the initial pressure selections for light weight cars. Similarly, the front contacts e of the repeater relays are connected through the cable C3 to other jacks on the panel IPL to provide for the selection of the partial pressure for light weight cars. To provide for the selection of initial and partial pressures for heavy weight cars, the front contacts d and f, respectively, of the repeater relays are similarly connected through cables C2 and C4 to terminal jacks on the panel IPH. In order to provide energy for the operation of the car retarder, the mating heels of the front contacts c and d of the repeater relays are connected in multiple to terminal B of the source over front or back contact 43, respectively, of the relay LPR and back contacts 45 and 46, respectively, of the control relays 1PPR and 2PPR, which relays will be referred to later. Similarly, the mating heels of the front contacts e and f of all the repeater relays are connected in multiple to terminal B of the source over front or back contact 44, respectively, of relay LPR, front contact 45 of relay 1PPR, and back contact 46 of relay 2PPR. It is to be seen, therefore, that energy is supplied for the selection of the initial pressures or partial pressures, respectively, in accordance with the position of the contacts of the relay 1PPR, the partial pressure selection being effected when this relay is energized to close its front contacts.

The terminals XPP, 1PP, 2PP, 3PP, and 4PP of the car retarder shown on Fig. 1b are each connected by the wires 51 to 55, respectively, to a jack on each of the panels IPL and IPH. It is then possible by the use of jumpers with plug connectors to complete connections for preselected pressure conditions of the car retarder in accordance with the leaving speed selected. These jumper connections are indicated conventionally by dotted lines within the dot-dash rectangles of the panel boards. For example, if the lever 1SL is operated to its heavyweight or first position to select a leaving speed of 4 miles per hour and if the full retarder pressure has been preselected as the initial pressure, energy would be supplied to the retarder from terminal B of the source over back contacts 46 and 45 of relays 2PPR and 1PPR, respectively, back contact 43 of relay LPR, front contact d of relay 1PR, cable C2, and the preselected jumper connection in the panel IPH to wire 55 and thence to terminal 4PP of the car retarder. This energizes the magnet R to apply the initial pressure of 100 pounds to the car as it enters the retarder. Any of the other three available pressure conditions of the car retarder could have been selected in this case by the proper connection of the jumper of the panel IPH to the wires 52, 53, or 54. Similarly, any partial pressure may be selected in this case by the proper connections in the panel IPH from the wires of cable C4 to one of the terminals of the car retarder through wires 52 to 54.

I shall refer now to the partial pressure and full release speed selective network PFS, which is fully described in the previously mentioned Agnew patent. It is sufficient herein to only briefly describe this network. Each front contact a and b and its corresponding mating heel contact of the lever repeater relays are connected to a pair of jacks on the panel PFS as indicated in Fig. 1a by the cable connections terminating at the panel. Also, the front contacts 56 to 61, inclusive, of the relays of the unit cycle counter UC are connected through cable C5 to another set of jacks on the panel PFS. Similarly, the corresponding heel contact of the front contacts 62 to 67 and 68 to 73 of the multiple cycle counting relays 1M to 6M are connected through cables C6 and C7, respectively, to other sets of jacks on the panel PFS. The mating heel contacts of the unit cycle counter relays 1U to 6U are connected in multiple to terminal B of the current source. It is to be seen that the front contacts 62 to 67 of the multiple cycle counting relays are connected in multiple to wire 74 and through this wire to the winding of the control relay 1PPR. Similarly, the front contacts 68 to 73 of these multiple cycle counting relays are connected in multiple to wire 75 and through this wire to the winding of the control relay 2PPR.

Thus, it is to be seen that by proper selection of the jacks on the panel PFS which are to be connected by jumpers, the control relay 1PPR may be energized at any preselected car speed, as measured by the counting relays, for any selected leaving speed, as indicated by the selector lever which has been operated by the control operator. The jumper connections established on the panel PFS are indicated on Fig. 1a by random dotted lines within the dot-dash rectangle used to designate the panel PFS. Energy is furnished to the winding of the relay 1PPR then from terminal B of the source at the front contacts 56 to 61 of the unit cycle counting relays 1U to 6U through the cable C5, the preconnected jumpers on the panel PFS, front contact a of the repeater relay corresponding to the operated selector lever, other jumpers preconnected on panel PFS, cable C6, front contacts 62 to 67 of the relays 1M to 6M, inclusive, wire 74, and the winding of the relay 1PPR to terminal N of the source. It will be recalled that the operation of relay 1PPR to close its front contact 45 causes the preselected partial pressure condition for the desired leaving speed to be established by the car retarder. It is to be noted that once picked up the relay 1PPR is held up until the car unit leaves that particular section of the car retarder. However, the holding and stick circuits for this relay are not a part of my invention and reference is made to the previously mentioned Agnew patent for a full description of the circuits.

In a similar manner, the control relay 2PPR can be energized when the speed of the car unit passing through the retarder reaches any preselected speed for any desired leaving speed. The relay 2PPR is energized over circuits similar to those for the relay 1PPR, except that front contacts b of the repeater relays are included in the circuit together with cable C7 and front contacts 68 to 73 of the relays 1M to 6M. The circuit is then completed over wire 75 through the winding of the relay 2PPR to terminal N. When relay 2PPR picks up, its front contact 46 completes a circuit for energizing the magnet X of the car retarder to release the retarder completely. This circuit may be traced from terminal B of the source at front contact 46 of relay 2PPR over wire 51 to terminal XPP, and thence through the winding of the magnet X to terminal N of the source. The relay 2PPR having picked up is also held up until the car unit leaves the track section through which it is passing at that time. Again, these holding and stick circuits are not shown and reference is made once again to the previously mentioned Agnew patent, it being sufficient here to show only that the relay is energized at any preselected car speed.

It is to be seen therefore that networks comprising the panels IPL, IPH, and PFS and the contacts of the various lever repeater relays, the relay LPR, and the control relays 1PPR and 2PPR provide means to select different initial and partial pressures and different partial pressure and full release speeds for each different leaving speed which may be designated by the selector levers, the pressure conditions also varying for different car weights. For example, I shall assume that a heavy weight car is approaching the car retarder and that the operator decides that this car should leave the retarder at a speed of 6 miles per hour. I shall also assume that for these conditions selections have previously been made for an initial pressure of 100 pounds and a partial pressure of 50 pounds to be applied by the car retarder and for a partial pressure release speed of 6.4 miles per hour and a full release speed of 5.8 miles per hour.

As the car approaches the retarder, the operator pushes the selector lever 3SL to its H position. The circuit is then established to cause the retarder to apply its full braking pressure to the car wheels. This circuit may be traced from terminal B at back contact 46 of relay 2PPR through back contact 45 of relay 1PPR, back contact 43 of relay LPR, front contact d of relay 3PR, cable C2, a jumper connection on the panel IPH, wire 55, terminal 4PP of the car retarder, and the winding of magnet R to terminal N of the source. Magnet R being thus energized causes the retarder to receive air at the full time pressure of 100 pounds. When this car unit, in any of the eleven track sections in the car retarder, is slowed to the speed of 6.4 miles per hour, a circuit is established to effect the partial pressure release by energizing the relay 1PPR. This circuit may be traced from terminal B through front contact 57 of relay 2U, cable C5, a jumper connection on the panel PFS, front contact a of relay 3PR, another jumper connection on panel PFS, cable C6, front contact 64 of relay 3M, wire 74, and the winding of relay 1PPR to terminal N. Relay 1PPR, thus energized, picks up to close its front contacts. This establishes a circuit for partial pressure selection which may be traced from terminal B over back contact 46 of relay 2PPR, front contact 45 of relay 1PPR, back contact 44 of relay LPR, front contact f of relay 3PR, cable C4, a jumper on panel IPH and wire 53 to terminal 2PP of the retarder. With energy on terminal 2PP, the retarder is effectively controlled by the pressure responsive device 2P to establish a pressure of 50 pounds, as was previously explained. When the speed of the car unit in one of the track sections approaches the actual preselected leaving speed, that is, the full release speed of 5.8 miles per hour, a circuit is established to energize the relay 2PPR. This circuit may be traced from terminal B of the source through front contact 59 of relay 4U, cable C5, a jumper on panel PFS, front contact b of relay 3PR, another jumper on panel PFS, cable C7, front contact 70 of relay 3M, wire 75, and the winding of relay 2PPR to terminal N of the source. Relay 2PPR picks up, closing its front contact 46 which places energy on wire 51 and the terminal XPP of the retarder. This energizes the magnet X which causes the retarder to release all pressure from the braking bars.

If, instead of a heavy weight car, the car had been of the light weight classification, the operator would have operated the selector lever 3SL to its second or L position. I shall assume here that an initial pressure of 75 to 85 pounds with a partial pressure between 25 and 35 pounds has been preselected with a partial pressure release speed of 6.7 miles per hour and a full release speed of 6.1 miles per hour. When the operator pushes the lever 3SL to its L position, a circuit is established for controlling the retarder to the preselected initial pressure. This circuit may be traced from terminal B over back contacts 46 and 45 of relays 2PPR and 1PPR, front contact 43 of the relay LPR, front contact c of the relay 3PR, cable C1, and a jumper on panel IPL to wire 54 and thence to terminal 3PP of the retarder. As previously explained, when energy is applied to the terminal 3PP, the retarder is controlled by the pressure tube 3P to establish a braking pressure of between 75 and 85 pounds, this pressure being maintained continuously. When the car unit speed in any track section reaches the partial pressure release speed of 6.7 miles per hour, the relay 1PPR is energized over a circuit which may be traced from terminal B through front contact 56 of relay 1U, cable C5, a jumper connection on panel PFS, front contact a of relay 3PR, another jumper connection on panel PFS, cable C6, front contact 64 of relay 3M, wire 74, and the winding of relay 1PPR to terminal N of the source. Closing of the front contacts of the relay 1PPR establishes a circuit for energizing the car retarder to establish the selected partial pressure of 35 pounds. The circuit may be traced from terminal B of the source at back contact 46 of relay 2PPR through front contact 45 of relay 1PPR, front contact 44 of relay LPR, front contact e of relay 3PR, cable C3, jumper on panel IPL, and wire 52 to terminal 1PP of the retarder. Energy being applied to the terminal 1PP causes the retarder to establish a braking pressure of between 25 and 35 pounds, as was previously described. When the speed of the car unit in any track section approaches the preselected full release speed of 6.1 miles per hour, a circuit is established from terminal B of the source over front contact 58 of relay 3U and thence as previously described for the heavy car through the various jumpers and cables to wire 75 and the winding of relay 2PPR. Again, the picking up of relay 2PPR to close its front contact 46 causes the full release of the car retarder.

It has thus been shown that the car retarder speed pressure selective control apparatus here provided has the advantage that various retarder leaving speeds can be established that will assure proper movement of the different car units to the classification tracks. In addition, different initial and partial braking pressure conditions of the retarder may be preselected for each leaving speed depending upon the weight classification of the car so that satisfactory handling of the car units through each retarder will be assured. This improved handling of each car unit through car retarder results in safer movement of the car and less damage to the contents of the car. Both these advantages are of great importance in the operation of classification yards.

Although I have herein shown and described but one form of car retarder speed pressure selective control apparatus embodying my invention, it is understood that various changes and modifications may be made within the scope of the appended claims without departing from the spirit and scope of my invention.

Having thus described my invention, what I claim is:

1. In combination, a stretch of railway track provided with a car retarder having several different braking pressure conditions, a series of control circuits connected to said retarder one for each of said braking pressure conditions, a series of selector levers one for each of several different assigned leaving speeds for said retarder, each said selector lever normally occupying a center position and operable to a first and second position, a series of selector lever repeater relays one for each of said selector levers, each said lever repeater relay being energized when its corresponding selector lever is operated to either said first or said second position, a lightweight repeater relay energized only when any one of said selector levers is operated to its second position; control panel means having a first and a second group of selective connections to said control circuits, each group providing a selection from said series of retarder control circuits for initial braking pressures for each of said several different leaving speeds, and a third and a fourth group of selective connections to said control circuits, each group providing a selection from said series of retarder control circuits for partial braking pressures for each of said several different leaving speeds; a first circuit means including a deenergized position contact and an energized position contact of said lightweight repeater relay and energized position contacts in multiple of said lever repeater relays to select between said first and said second group of selective connections, and a second circuit means including another deenergized and another energized position contact of said lightweight repeater relay and other energized position contacts in multiple of said lever repeater relays to select between said third and said fourth groups of selective connections, whereby a different initial braking pressure and a different partial braking pressure is established according to the recorded weight classification of each railway car for each of said several different assigned leaving speeds.

2. In combination with a railway car retarder having several different braking pressure conditions and a series of control circuits connected to said retarder one for each of said braking pressure conditions, means for selecting as initial and partial braking pressures for a railway car a particular pair of said retarder braking pressure conditions according to the recorded weight classification of that car and the desired leaving speed, said means including a series of selector levers one for each of several different assigned leaving speeds for said retarder, each lever having a normal position and operable to a heavy position and a light position, a series of lever repeater relays one for each of said selector levers, each lever repeater relay being energized when its corresponding selector lever is operated to either said light position or said heavy position, a light position repeater relay; circuit means to energize said light position repeater relay including in multiple a contact of each selector lever closed only when that lever is operated to its light position, rectifiers poled to block the flow of energy to said light position repeater relay when any one of said levers is operated to said heavy position, and other rectifiers poled to prevent the energization of any lever repeater relay not energized by its corresponding lever; a first series of circuits each including a deenergized position contact of said light position repeater relay and an energized position contact of one of said lever repeater relays, each said first circuit connected to a preselected one of said retarder control circuits, and a second series of circuits each including an energized position contact of said light position repeater relay and another energized position contact of one of said lever repeater relays, each said second circuit connected to a pre-selected one of said retarder control circuits.

References Cited in the file of this patent

UNITED STATES PATENTS

| | | |
|---|---|---|
| 2,022,086 | Livingston | Nov. 26, 1935 |
| 2,061,753 | Bone | Nov. 24, 1936 |
| 2,331,125 | Logan | Oct. 5, 1943 |
| 2,751,492 | Fitzsimmons | June 19, 1956 |